P. D'OULTREMONT.
LUBRICATOR.
APPLICATION FILED NOV. 11, 1911.

1,051,982.

Patented Feb. 4, 1913.

Witnesses:
Willis L. Hurd.
James H. Brown

Inventor:
Pierre d'Oultremont
By J. H. Cobb,
his attorney,

UNITED STATES PATENT OFFICE.

PIERRE D'OULTREMONT, OF BRUSSELS, BELGIUM.

LUBRICATOR.

1,051,982.  Specification of Letters Patent.  Patented Feb. 4, 1913.

Application filed November 11, 1911. Serial No. 659,840½.

*To all whom it may concern:*

Be it known that I, PIERRE D'OULTREMONT, a subject of the King of Belgium, residing at Brussels, Belgium, have invented certain new and useful Improvements in Lubricators, of which the following is a specification.

This invention relates to improvements in lubricators, its primary object being to provide a highly sensitive valve adapted to be operated by vibration of the apparatus to which the lubricator is attached, to permit the lubricant to be fed or distributed to the machine.

The valve comprehended by my invention is freely mounted upon a seat and normally closes the distributing conduit in an air tight manner, when the machine is at rest, thus minimizing any waste of lubricant but assuring a supply of oil when the apparatus is in motion, the amount of said supply being proportionate to the amplitude of the vibration imparted to said valve.

Other advantages of my device are that, owing to the peculiar form of valve closure, the wear on said valve is negligible, and any impurities contained by the oil are prevented from collecting in the discharge opening through which they are permitted to pass, or are forced, by the oscillating movement of the valve, which will thus not be interfered with in operation.

Still a further object is subserved by the use of novel means for regulating the amplitude of vibration of my valve so that in cold weather, for instance, when the oil is heavy, the supply thereof may be suitably controlled.

The valve rests on a seat formed by the edge of the discharge opening, and is in stable equilibrium on the latter. The vibrations of the machine to which the lubricator is applied to, cause the valve to oscillate, and it swings about a point of rest on the edge of the opening aforesaid, the lateral movements of the upper portion of the valve raising it from its seat and permitting the oil to escape into the discharge passage.

For a full understanding of the present invention, reference is to be had to the following description and the accompanying drawings, in which—

Figure 1:
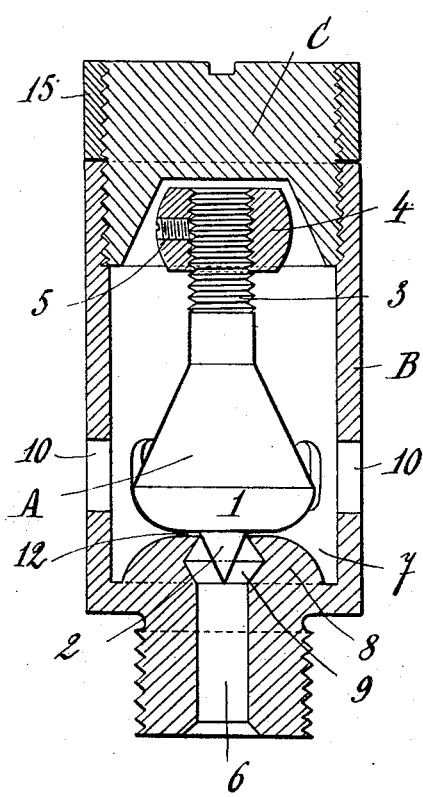
Figure 2:
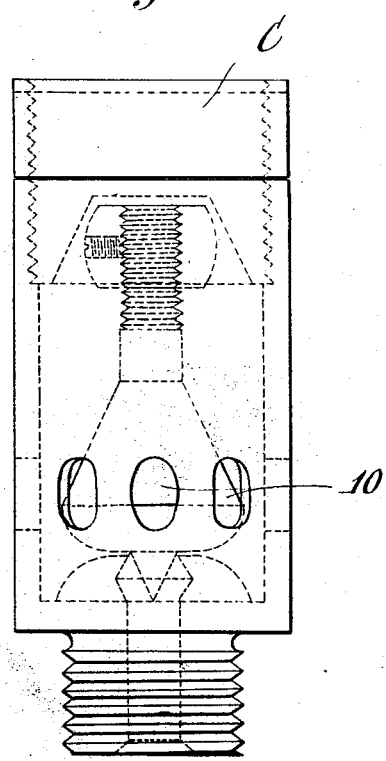

Figure 1 is a vertical sectional view of a lubricator constructed in accordance with my invention; and Fig. 2 is an elevation thereof.

Throughout the following detail description and on the several figures of the drawings, similar parts are referred to by like reference characters.

Specifically describing my invention, and referring to the drawing, A designates the valve proper which is contained within the body of the lubricator B, the latter being provided with a closure, or cap C, therefor. The valve A is conical in shape and formed with a convex base, in the center of which is located a projection or obturating point 2. Extending upwardly from the upper portion of the valve 1 is a threaded spindle 3, upon which is screwed an adjusting nut 4. A set-screw 5 extends through a lateral opening in the nut 4, by means of which said nut may be positively held at its proper adjustment on the spindle 3.

As will be clearly noted in Fig. 1 of the drawing, the cap C is conically recessed to permit the upper end of the valve rod 3 with the nut 4 thereon, to be received thereinto. Said cap by its threaded connection with the body of the lubricator may be suitably adjusted with respect to the nut 4, and in this manner regulating the amplitude of the oscillation of the valve, as will be hereinafter more fully described. A collar 15 is secured to the cap C in order to lock the same in position after it has been adjusted.

The convex base of the valve 1 is seated on the oppositely convex bottom 8 of the body B, said bottom being provided centrally thereof with the distributing passage 6 extending therethrough. The upper portion of the passage 6, adjacent its opening into the compartment 7 of the body, is enlarged to form an annular chamber or recess 9, for the purpose of facilitating the movements of the point 2 extending into the passage, as well as the escaping of the oil. The upper diameter of the conduit 6 is practically the same as that of the base of the point 2.

The body B is provided adjacent its lower portion with a plurality of openings 10, affording passage to the oil into the compartment 7.

As will be apparent from the foregoing description, the center of gravity of the valve A, while preferably above the point of support, may be easily shifted as required so that the sensitiveness may be increased or decreased, as desired. The shocks or vibrations impart to the valve oscillatory movement on the edge of the outlet passage 6 which permits oil to be fed methodically and continuously from the compartment 7, during the operation of the machine to which it is attached. The supply of the oil may be regulated at will by adjustment of the nut 4 with respect to the cap C, or vice versa, according to the requirements and the amplitude of the oscillations of the valve, as well as its sensitiveness. Accordingly as the nut 4 is shifted upward or downward on the screw threaded rod 3, the clearance between the cap C and the nut 4, and consequently the amplitude of oscillation of the valve A, is reduced or increased. It will be readily understood that the operation will result in increasing or reducing the space uncovered between the point 2 and the edge 12. When, therefore, it is necessary to have a larger supply of oil, for instance in cold weather when the oil is thicker, it will be only necessary to lower the nut 4. The nut 4 may also be fixed and consequently the position of the center of gravity of the valve invariable when the working conditions require it. The regulation of the amplitude of the oscillations of the valve are then controlled by proper adjustment of the cap C with respect to the nut.

Having thus described the invention, what is claimed as new is:

1. An automatic adjustable lubricator, comprising a receptacle or casing for containing the lubricant, said receptacle being provided with a distributing conduit, an oscillating valve in said receptacle, having a valve rod, said valve normally closing the distributing conduit aforesaid and resting in stable equilibrium thereon, and an adjustable weight mounted on the valve rod aforesaid.

2. An automatic adjustable lubricator, comprising a receptacle or casing for containing the lubricant, said receptacle comprising a wall and also having a distributing conduit, an oscillating valve in said receptacle having a valve rod and provided with an obturating point normally closing the distributing conduit, and an adjustable weight mounted on said valve rod and coöperating with the contracted wall of said receptacle.

3. An automatic adjustable lubricator, comprising a receptacle or casing for containing the lubricant, having a wall, said receptacle having a convex bottom, a distributing conduit opening concentrically into said convex bottom and recessed to form a chamber, an oscillating valve in said receptacle having a valve rod, and an obturating point normally closing the distributing conduit, and an adjustable weight mounted on said valve rod and coöperating with the contracted wall of the receptacle.

4. An automatic adjustable lubricator, comprising a receptacle or casing for containing the lubricant, an adjustable closure cap for said receptacle having a conical recess therein, the receptacle having a concentric distributing conduit opening thereinto, an oscillating valve in said receptacle, having a rod, and an obturating point normally closing said distributing conduit, and a regulating weight adjustable on said valve rod and coöperating with the conical recess of the cap aforesaid.

In testimony whereof I have signed my name to this specification in the presence of two subscribing witnesses.

PIERRE d'OULTREMONT.

Witnesses:
ARMAND EUREL,
CHAS. ROY NASMITH.